(12) United States Patent
Burmester et al.

(10) Patent No.: US 7,817,820 B2
(45) Date of Patent: Oct. 19, 2010

(54) METHOD AND SYSTEM FOR GENERATING AND USING DIGITAL FINGERPRINTS FOR ELECTRONIC DOCUMENTS

(75) Inventors: Michael Burmester, Tallahassee, FL (US); Tri Van Le, Tallahassee, FL (US)

(73) Assignee: Florida State University, Tallahassee, FL (US)

( * ) Notice: Subject to any disclaimer, the term of this patent is extended or adjusted under 35 U.S.C. 154(b) by 0 days.

(21) Appl. No.: 12/176,078

(22) Filed: Jul. 18, 2008

(65) Prior Publication Data
US 2008/0295149 A1 Nov. 27, 2008

Related U.S. Application Data

(63) Continuation of application No. 10/998,299, filed on Nov. 26, 2004, now abandoned.

(60) Provisional application No. 60/525,389, filed on Nov. 25, 2003.

(51) Int. Cl.
*G06K 9/00* (2006.01)
(52) U.S. Cl. .................. 382/100; 713/176
(58) Field of Classification Search ........... 382/100, 382/112, 115, 124; 713/176, 186; 726/21–23
See application file for complete search history.

(56) References Cited

U.S. PATENT DOCUMENTS

| | | | |
|---|---|---|---|
| 6,226,640 B1 | 5/2001 | Ostrovsky | 707/5 |
| 6,505,302 B1 * | 1/2003 | Matyas et al. | 713/169 |
| 6,590,995 B1 | 7/2003 | Schwenk | 382/100 |
| 7,047,413 B2 * | 5/2006 | Yacobi et al. | 713/176 |
| 2002/0191810 A1 * | 12/2002 | Fudge et al. | 382/100 |
| 2004/0010692 A1 | 1/2004 | Watson | 713/176 |
| 2004/0057597 A1 * | 3/2004 | Rhoads | 382/100 |
| 2004/0098593 A1 * | 5/2004 | Muratani | 713/176 |

OTHER PUBLICATIONS

Lofvenberg, J.; Wiberg, N.; Random codes for digital fingerprinting. Information Theory, 1998. Proceedings. 1998 IEEE International Symposium on Aug. 16-21, 1998 p. 80.*
Dittmann, J.; Combining digital watermarks and collusion secure fingerprints for customer copy monitoring. Secure Images and Image Authentication (Ref. No. 2000/039), IEE Seminar on Apr. 10, 2000 pp. 6/1-6/6.*
Trappe, W.; Min Wu; Wang, Z.J.; Liu, K.J.R.; Anti-collusion fingerprinting for multimedia. Signal Processing, IEEE Transactions on [see also Acoustics, Speech, and Signal Processing, IEEE Transactions on] vol. 51, Issue 4, Apr. 2003 pp. 1069-1087.*

(Continued)

*Primary Examiner*—Vikkram Bali
*Assistant Examiner*—Julian D Brooks
(74) *Attorney, Agent, or Firm*—Ballard Spahr LLP (57) ABSTRACT

This invention is directed to a method and system for generating and using digital fingerprints in copies of an electronic document so that it is possible to determine at least one from among a group of purchasers colluding to forge a digital fingerprint. The present method and system is suitable for copyright protection and can be used to identify purchasers who illegally redistribute copies even after the document has been manipulated.

6 Claims, 10 Drawing Sheets

OTHER PUBLICATIONS

Boneh, D. and Shaw, J.; *Collusion-Secure Fingerprinting for Digital Data*; Advances in Crytology-CRYPTO95, vol. 963, Aug. 1995; pp. 452-465.

Boneh et al.; *Collusion-Secure fingerprinting for digital data*; IEEE Transactions on Information Theory, vol. 44, No. 5; Sep. 1998; pp. 1897-1905.

Burmester et al.; *Short c-secure Fingerprinting Codes*; Proceedings of the 6th Information Security Conference, Lecture Notes in Computer Science, vol. 2851, Oct. 2003; pp. 422-427.

Chernoff, H.; *A measure of asymptotic efficiency for tests of a hypothesis based on the sum of observations*; Annals of Mathematical Statistics, vol. 23, Dec. 1952; pp. 493-507.

Domingo-Ferrer et al.; *Short collusion-secure fingerprints based on dual binary Hamming codes*; Electronics Letters, vol. 36, No. 20, Sep. 28, 2000; pp. 1697-1699.

Hoeffding, W.; *Probability inequalities for some of bounded random variables*; American Statistical Association Journal, vol. 58, No. 301, Mar. 1963; pp. 13-30.

MacWilliams et al.; *The Theory of Error-Correcting Codes*; Amsterdam, North-Holland, vol. 16, ch.1, §7, 1977; pp. 22-27.

Sebé et al.; *Short 3-secure fingerprinting codes for copyright protection*; Proceedings of Information Security and Privacy, 7$^{th}$ Australian Conference, Lecture Notes in Computer Science, vol. 2384, Jul. 2002; pp. 316-327.

\* cited by examiner

|   | 1 | 2 | ... | j | ... | l |
|---|---|---|---|---|---|---|
| $x_1$ | 1 | 0 |   | 1 |   | 1 |
| $x_2$ | 0 | 1 |   | 1 |   | 0 |
| ⋮ |   |   |   |   |   |   |
| $x_i$ | 0 | 1 |   | $x_{ij}$ |   | 1 |
| ⋮ |   |   |   |   |   |   |

The *j-th* bit of fingerprint $x_i$ is a random bit

METHOD AND SYSTEM FOR GENERATING AND USING DIGITAL FINGERPRINTS FOR ELECTRONIC DOCUMENTS

CROSS REFERENCE TO RELATED PATENT APPLICATIONS

This application is a continuation application under 37 CFR 1.53(b) of U.S. patent application Ser. No. 10/998,299, filed Nov. 26, 2004 now abandoned, which claims priority to U.S. Provisional Application No. 60/525,389, filed Nov. 25, 2003, each of which are herein incorporated by reference in their entirety under 35 U.S.C. §120.

BACKGROUND OF INVENTION

The rapid growth of personal computers, the internet, and more recently peer-to-peer services has presented digital content publishers with the challenge of protecting their content from unauthorized copying and redistribution. The ease of distributing digital content via the internet and the sophistication of those making unauthorized copies has created a need for a method which allows publishers to trace unauthorized copies back to one or more persons who produce them.

Publishers today are increasingly distributing their content in digital form, such as MPEG video and mp3 audio. The first challenge that arises when a publisher distributes a digital file or document is that of simple or naïve copying and redistribution. In such a scenario, an authorized purchaser of an electronic file or document makes an exact copy of his file and provides it to another person.

Publishers first fought the challenge of naïve copying and distribution by imbedding digital watermarks into each authorized copy of their content. Each watermark could identify the copyright holder or owner of the document. While watermarking allows a publisher to identify content that it owns, it does little to identify those responsible for unauthorized copying and distribution.

Publishers next used digital fingerprints to stem the tide of unauthorized copying and distribution. A digital fingerprint is a type of watermarking technique in which each copy of an electronic document has information inserted which can uniquely identify the authorized holder of the document. Since inserting a digital fingerprint changes the content of a document, fingerprints need to be small compared to the size of the document so that the authorized copy remains approximately true to the original. Fingerprints that are too large may perceptibly change the color of a digital image or distort the sound of a digital audio file.

A purchaser examining a single fingerprinted copy of an electronic document cannot determine which parts of his document are part of the fingerprint and which parts are not, making removal of the fingerprint difficult. Thus, in the case of naïve copying, a digital fingerprint can be used to trace an electronic document back to its original authorized purchaser. While a digital fingerprint provides a way to combat simple unauthorized copying and distribution, those involved in producing unauthorized copies have become much more sophisticated by acting together.

A group of two or more purchasers acting together may undertake a joint attack on a fingerprinting scheme. As discussed above, a digital fingerprint uniquely identifies a customer based on data inserted into an electronic document which is invisible to the individual purchaser. However, a group of colluding purchasers can compare their copies and determine at which points their copies differ. Since each fingerprint is unique, the points at which the colluders' documents differ reveals parts of their individual fingerprints. Thus, a group of colluding purchasers can compare their copies and use that information to attack or change a fingerprint in an effort to produce a forged fingerprint which is either associated with no purchaser or associated with an innocent purchaser. In either event, the colluders are free to boldly distribute copies with forged fingerprints across today's high-speed networks. Therefore, a method is needed which can identify colluders even after they forge a digital fingerprint.

Currently, prior-art methods exists which allow a publisher to trace a forged fingerprint back to at least one colluding forger. However, these methods produce fingerprints which are too large to be practical when the number of authorized copies distributed is large.

D. Boneh and J. Shaw, in "Collusion-Secure fingerprinting for digital data", IEEE Trans. Inf. Theory, vol IT-44, no. (5), pp. 1897-1905, 1998, discussed the theoretical background for fingerprints that are c-collusion secure, meaning the fingerprints can trace an unauthorized copy back to at least one member of a group of c colluders with an error of E when there are n authorized purchasers. Boneh and Shaw provided a fingerprinting method where the length of the fingerprint is given by $l=32\, c^4 \log(2n/E)\log(16\, c^2 \log(2n/E)/E$, which generates fingerprints which are unsuitably large when the number of purchasers is large.

Boneh and Shaw also proved the length of a c-collusion secure fingerprinting code cannot be less than the logarithm of the number of fingerprinted copies issued. It would therefore be desirable to have a fingerprinting method which conforms to the lower bound.

Another fingerprinting technique, described in U.S. Pat. No. 6,590,995, uses digital fingerprints based on finite geometric structures. The length of these fingerprints is proportional to the $(c+1)^{st}$ power of the number of customers n and hence is undesirable for a large number of customers.

The present invention provides a c-collusion secure digital fingerprinting method and system which conforms with the lower bound for fingerprint size and is therefore desirable for use as a digital fingerprinting scheme.

SUMMARY OF INVENTION

The present invention provides a method and system for generating and using digital fingerprints in electronic documents. The digital fingerprints of the present invention are c-collusion secure, meaning that at least one from among a group c of fingerprint forgers can be determined based on the forged fingerprint.

The mathematical variables of the several embodiments below are described as follows. The number of purchasers of a given electronic document is n. The number of purchasers colluding to forge a digital fingerprint is c. The length of a digital fingerprint is l. The error in identifying a colluder is E. The digital fingerprint of user n is $x_n$. User n may be denoted by $w_n$. The character p refers to a probability, and z refers to a forged digital fingerprint. The asymmetric Hamming distance between a forged fingerprint z and an authorized fingerprint x is d. A sub-set is defined in the present invention as consisting of any number from one to all members of the parent set.

The present invention relates to generating and using digital fingerprints for electronic documents. As used herein for the several embodiments below, the terms 'electronic document', 'digital document', 'document', 'digital content', 'content', 'digital file', and 'file', are used interchangeably and refer to digital files of both binary and text types, including but not limited to video files such as MPEG files, image files such as jpeg and bitmap files, sound files such as wav and mp3 files, word processing files such as Microsoft word files, word processing files such as ASCII files, and binary program files such as exe files.

The proliferation of high-speed internet connections and large file sharing services such as peer-to-peer networks makes the distribution of unauthorized digital content fast, easy, and alluring for content purchasers. While digital fingerprinting has previously provided a way to determine the user responsible for unauthorized copying and distribution, the prior art has provided c-collusion secure fingerprints which are too long to be feasible when the number of purchasers n is large.

The present invention provides several embodiments which may be used to produce short c-collusion secure digital fingerprints. In one embodiment of the present invention, a set of random bits is generated. A sub-set is then selected as a fingerprint. In a second embodiment, a real number p is chosen such that $1-(1/c) \leq p \leq 1$, and a set of random bits is generated such that bit 1 has probability p and bit 0 has probability 1−p. A sub-set is then selected as a fingerprint.

A third embodiment utilizes a random key input into a random number generator, where the output of the random number generator is a pseudo-random number assigned to a set of pseudo-random numbers. A sub-set is then selected as a fingerprint.

The above described embodiments for generating digital fingerprints have several advantages. First, the process of generating random or pseudo-random bits is fast and simple, making implementation easy. Second, because the system is easy to implement, it is less prone to human error and thus more robust. Third, new fingerprints can be generated only when needed such as when a new document is purchased. This keeps the publisher from having to pre-generate and store all of the fingerprints he or she plans to use.

A further embodiment of the present invention utilizes a database containing fingerprint and purchaser information so that authorized fingerprints can be easily retrieved for purposes such as comparison to a forged fingerprint or identification of a purchaser based on an authorized fingerprint.

Another embodiment allows a publisher of digital content utilizing fingerprints of the present invention to determine at least one from among a group of colluders c who compared their copies in order to forge a digital fingerprint. First, a fingerprint is extracted from an unauthorized copy of an electronic document. Second, in this embodiment, the forged fingerprint z is compared with authorized fingerprints $x_i$ by computing the asymmetric Hamming distance d for each (z, $x_i$) pair. The asymmetric Hamming distance d between z and $x_i$ is the sum of the number of columns where bit $x_i$ is 1 and bit $z_i$ is 0. The fingerprint with the minimum Hamming distance is chosen and the purchaser information for that fingerprint is retrieved. This embodiment of the present invention may thus identified a colluder from among a group of colluders c with an error E.

As discussed above, the Boneh-Shaw method provides a c-collusion secure fingerprint which is too long to be feasible when the number of content purchasers is large. For c=3, $E=10^{-10}$, and n=131,072, the Boneh-Shaw method produces a fingerprint 6,115,982 bits or approximately 745 kilobytes long. Clearly, changing 745 kilobytes of a 3,000 kilobyte mp3 file would render it inharmonious.

One advantage of the present invention is that it generates c-collusion secure digital fingerprints which are short enough to be feasible even when the number of purchasers n is large. When the present invention is used for $c \geq 2$, $n \geq 1$, and $E > 0$, fingerprints of length $l=O(\mathrm{Ln}\ n/E)$ are generated, meaning that fingerprint size is logarithmic in the number of copies distributed. By way of comparison, the present invention generates digital fingerprints of length l=113,618 bits or approximately 14 kilobytes using the same variables as the Boneh-Shaw example above. The present invention also meets the Boneh-Shaw lower bound length for c-collusion secure digital fingerprints. Thus, the method and system of the present invention provides digital content holders with the best possible way to distribute collusion-secure electronic documents to a large number of purchasers without sacrificing the integrity of their content.

BRIEF DESCRIPTION OF DRAWINGS

The accompanying drawings, which are incorporated in and constitute a part of this specification, illustrate embodiments of the invention, and together with the description, serve to explain the principles of the invention.

DETAILED DESCRIPTION OF INVENTION

The method and system of the present invention is drawn to c-collusion-secure digital fingerprints of optimally short length, meaning that fingerprints of the present invention may be used to determine at least one from among a group of c purchasers who collude to forge a digital fingerprint. The organization and operation of this invention will be understood from a consideration of detailed descriptions of the illustrated embodiments when taken in conjunction with the ten accompanying drawings.

Figure 1:
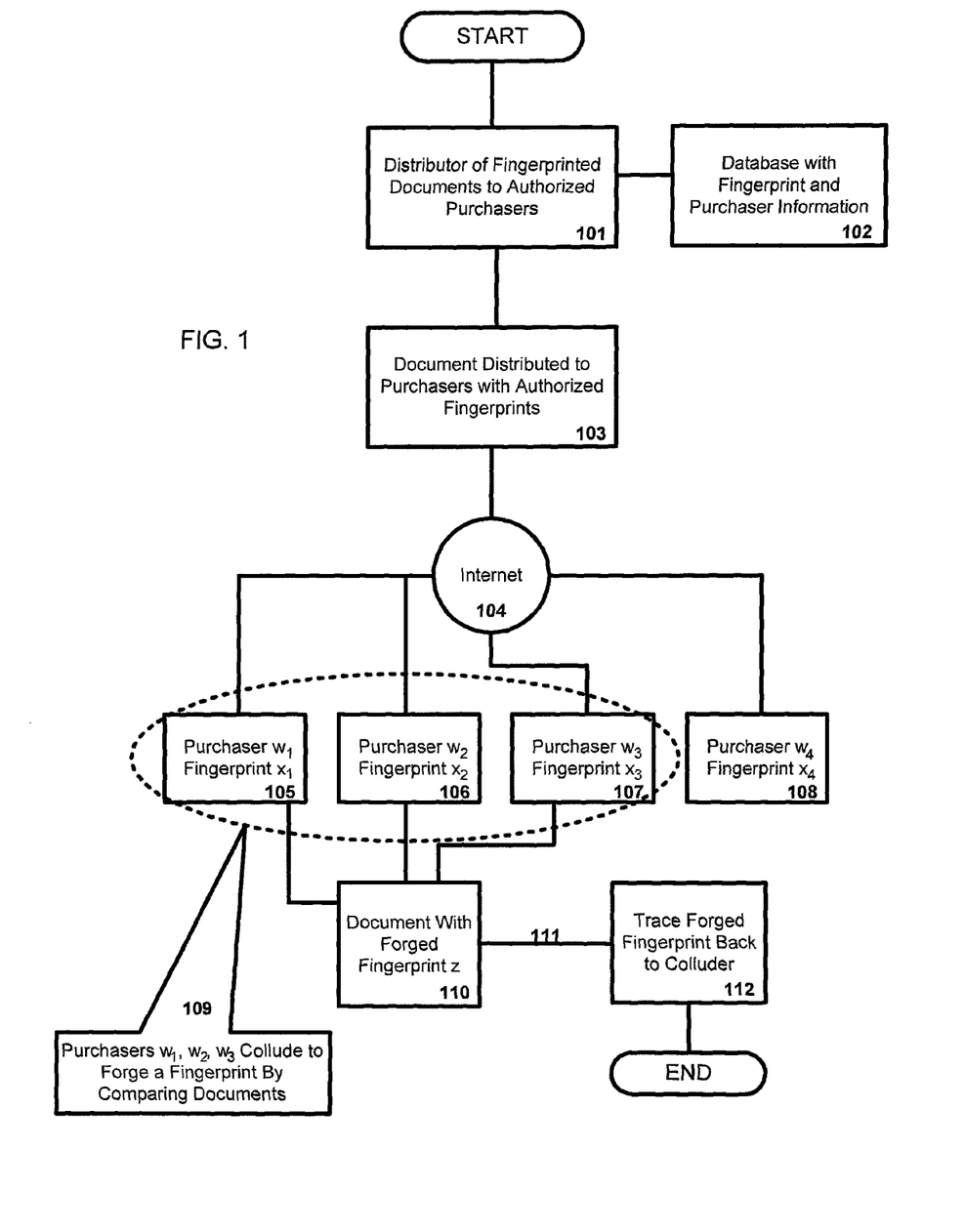
FIG. 1 illustrates an overview of the preferred embodiment of the present invention as used by publishers of electronic documents to trace unauthorized copies of their content.

FIG. 1 provides a preferred embodiment overview of how the present invention may be used by publishers of electronic documents to digitally fingerprint their published content in such a way that at least one of a collusion of purchasers who forge a digital fingerprint may be identified. In the preferred embodiment, a distributor of digitally fingerprinted electronic documents 101 has digitally fingerprinted content to be distributed and stores the fingerprint-purchaser information in a database 102.

In the preferred embodiment, the publisher then distributes digitally fingerprinted electronic documents to authorized purchasers 103 using the internet 104. In the present example, purchaser $w_1$ obtains the document with fingerprint $x_1$ 105, purchaser $w_2$ obtains the document with fingerprint $x_2$ 106, purchaser $w_3$ obtains the document with fingerprint $x_3$ 107, and purchaser $w_4$ obtains the document with fingerprint $x_4$ 108. Authorized purchasers $w_1$, $w_2$, and $w_3$ then collude to produce a forged fingerprint 109 by comparing their copies to determine fingerprint locations 114 and produce a document with a forged fingerprint z 110 which is not associated with any purchaser. In the preferred embodiment, the method and system of the present invention is then used to trace the forged fingerprint back to at least one of the colluders $w_1$, $w_2$, or $w_3$ 112.

Figure 2:
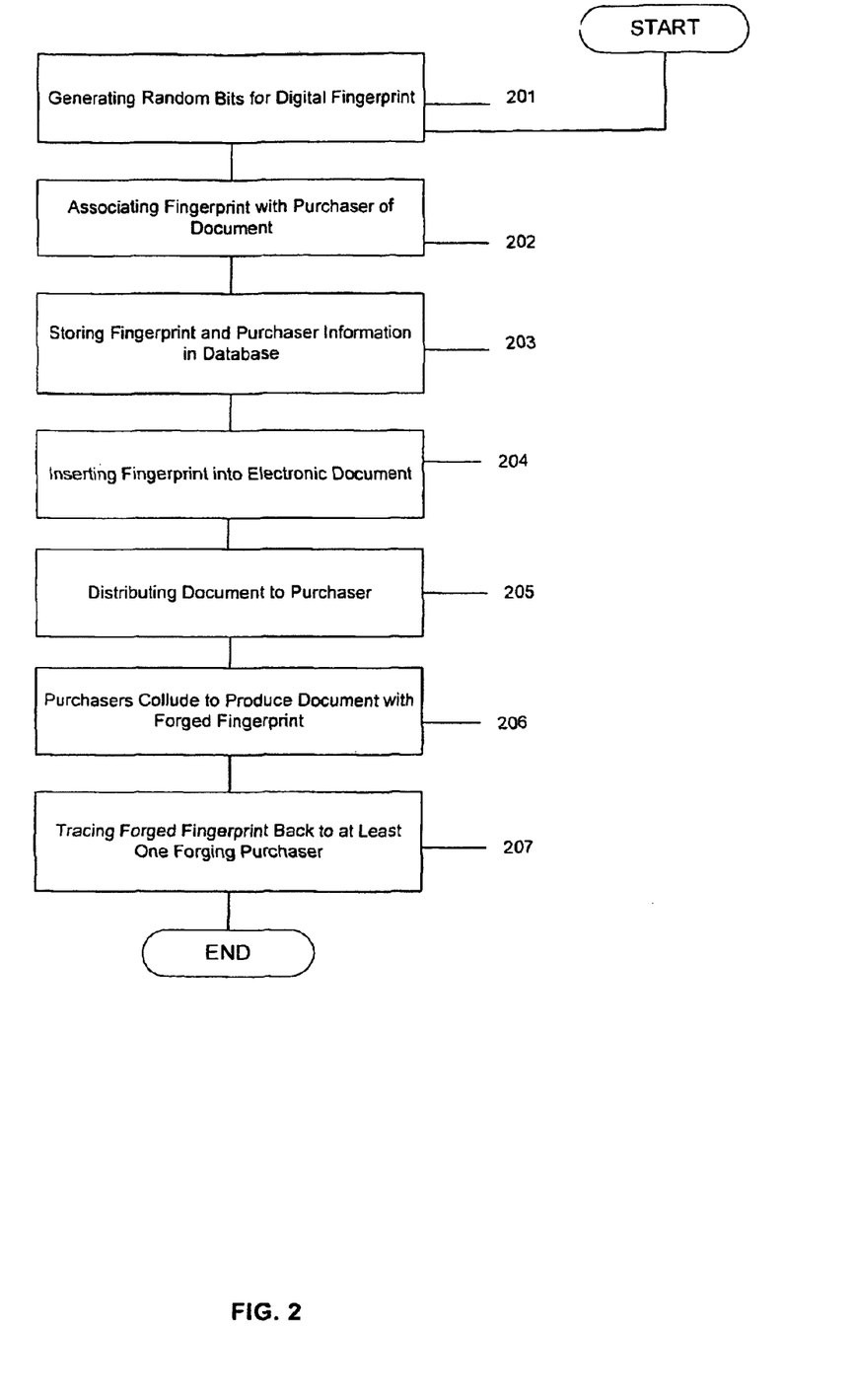
FIG. 2 illustrates an exemplary embodiment wherein the present invention is used to identify at least one from among a group of digital fingerprint forgers.

FIG. 2 illustrates an overview of one embodiment wherein the present invention is used to trace a forged fingerprint back to at least one forger. First, a publisher of an electronic document who wishes to protect his content from unauthorized copying and distribution generates random bits for use as digital fingerprints 201. An authorized purchaser then wishes to obtain a copy of the publisher's electronic document, causing the publisher to associate a fingerprint with the purchaser 202. The purchaser and fingerprint information is then stored in a database 203 in the preferred embodiment so that the publisher may easily manipulate fingerprint and purchaser information. The fingerprint associated with the purchaser is then inserted into the electronic document 204 requested before distribution 205 of the document to the purchaser.

In one embodiment as illustrated in FIG. 2, purchasers then collude to produce a copy of the electronic document with a forged fingerprint 206. Finally, using the method and system of the present invention, the publisher traces the forged fingerprint back to at least one forging purchaser 207.

Figure 3:
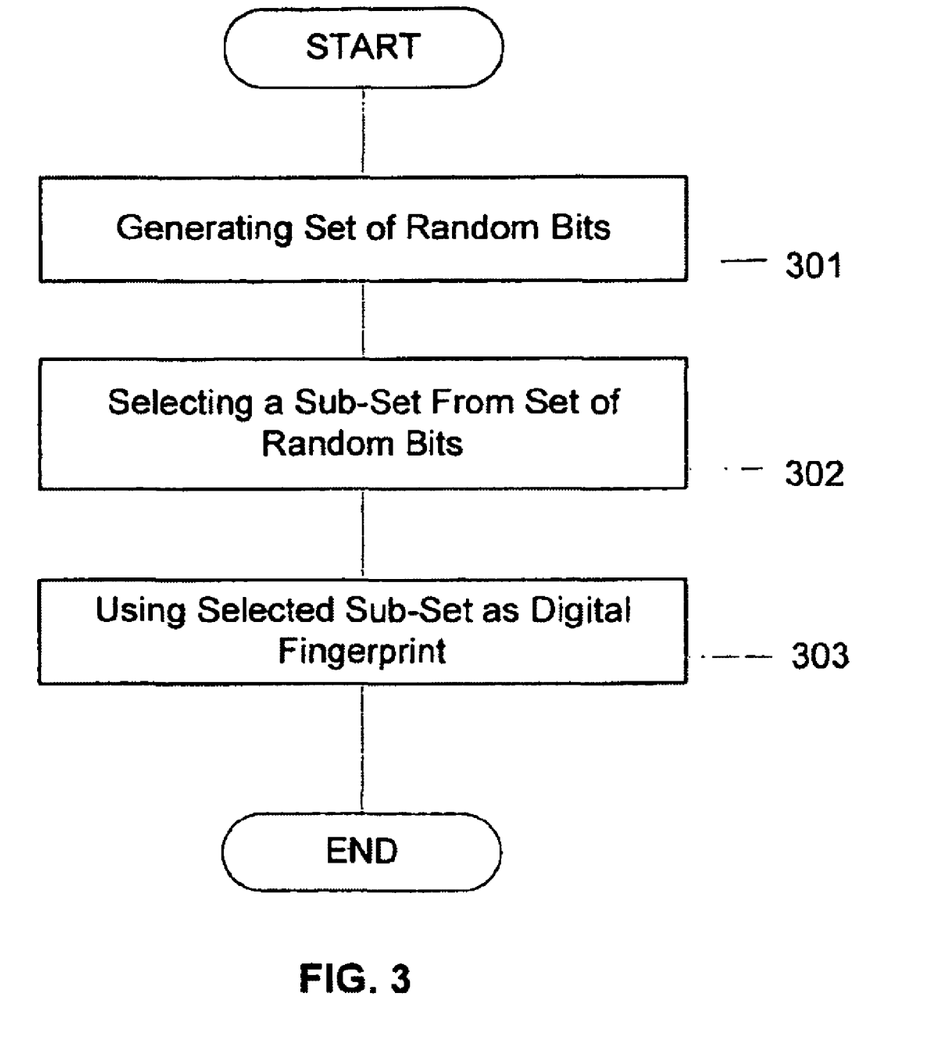
FIG. 3 illustrates one embodiment for the generation of random digital fingerprints according the to the present invention.

FIG. 3 illustrates one embodiment for generation of the c-collusion secure digital fingerprints of the present system and method. First, a set of random bits is generated 301. Then, a sub-set of the set of random bits is selected 302. The selected sub-set is then used as a digital fingerprint 303.

Figure 4:
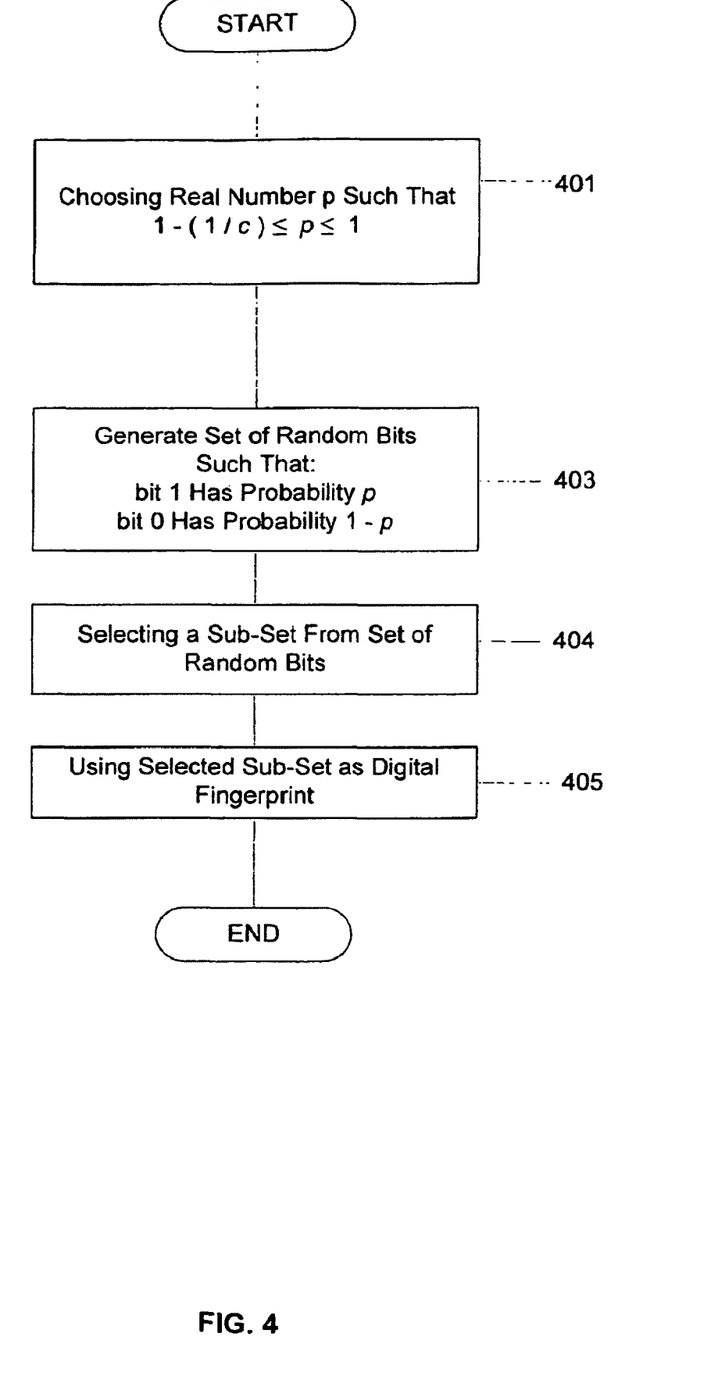
FIG. 4 illustrates another embodiment for the generation of random digital fingerprints according the to the present invention.

Another embodiment of the present invention is provided in FIG. 4 whereby a c-collusion secure digital fingerprint of the present system and method can be generated. First, a real number p is chosen such that $1-(1/c) \leq p \leq 1$ 401. Then, the set of random bits is generated such that bit 1 has probability p and bit 0 has probability 1−p 402. Next in this embodiment, a sub-set from the set of random bits generated is selected 403. Finally, the selected sub-set of random bits is used as a digital fingerprint 404.

Figure 5:
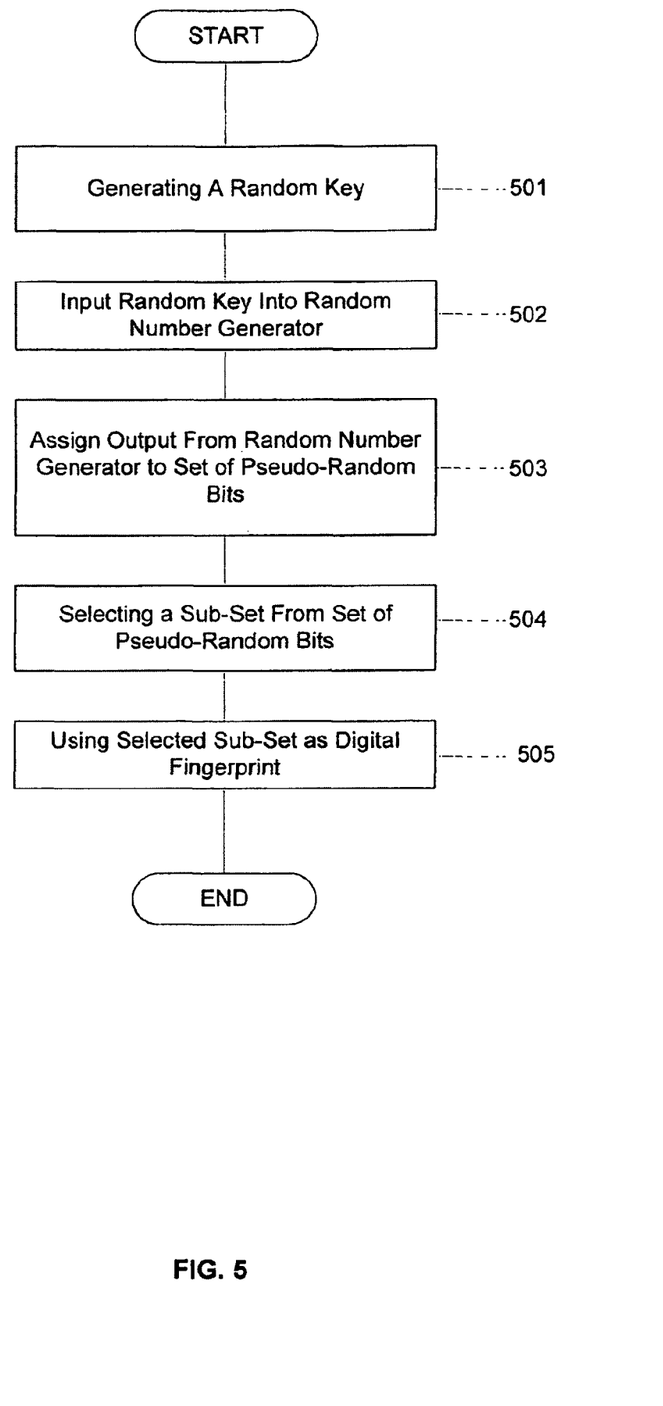
FIG. 5 illustrates another embodiment for the generation of pseudo-random digital fingerprints according the to the present invention.

A further embodiment is shown in FIG. 5 whereby a c-collusion secure digital fingerprint of the present system and method is generated. First, a random key is generated 501. There are numerous methods known to those skilled in the art whereby random keys can be generated. Second, the random key generated is input into a random number generator 502. Random number generators are also widely known to those skilled in the art. The output of the random number generator, which consists of pseudo-random bits, is assigned to a set of bits 503. A sub-set is then selected from the generated set of pseudo-random bits 504. Finally, in this embodiment, the selected sub-set of bits is used as a digital fingerprint.

Figure 6:
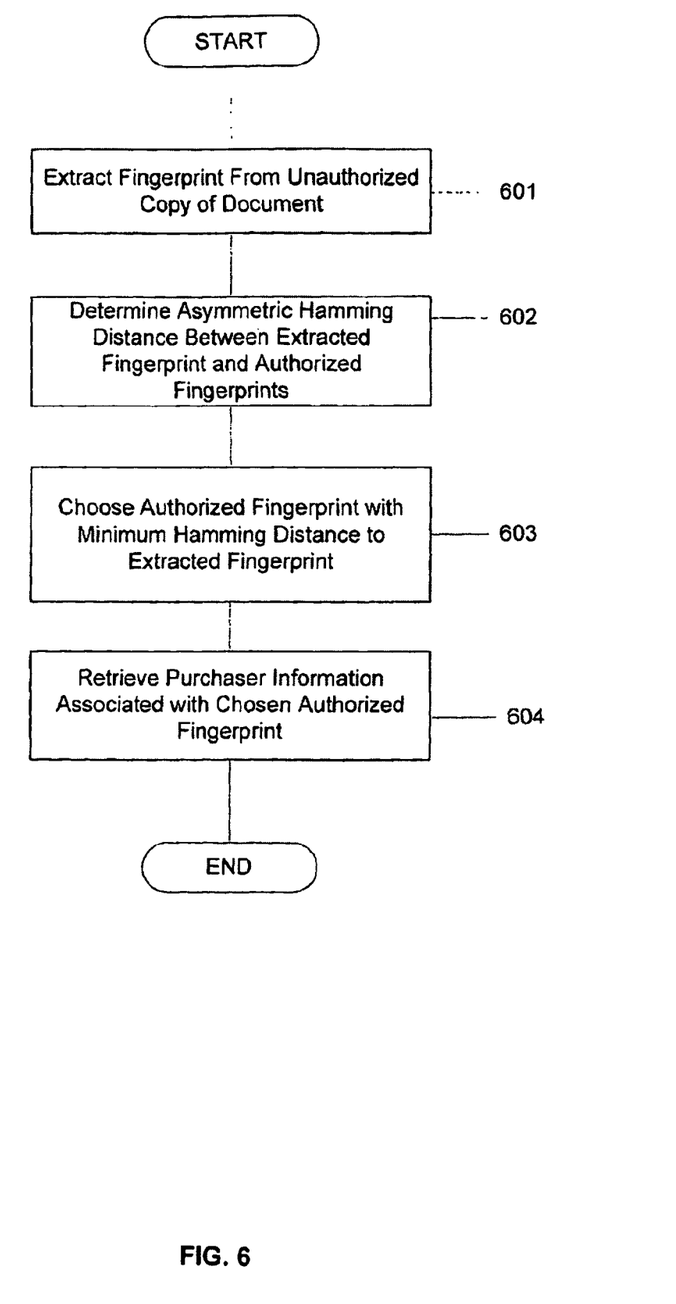
FIG. 6 illustrates one embodiment whereby one of a group of fingerprint forgers is identified.

FIG. 6 of the present invention illustrates one embodiment whereby at least one of a group of forgers is determined based on the content of the forged digital fingerprint. First, the fingerprint is extracted from an unauthorized copy of an electronic document 601. Second, the asymmetric Hamming distance between the forged fingerprint and authorized fingerprints for the document is determined 602. Third, in this embodiment, the authorized fingerprint with the minimum Hamming distance to the extracted forged fingerprint is chosen 603. Finally, the identity of at least one forger is determined by retrieving the purchaser information associated with the chosen authorized fingerprint 604.

Figure 7:
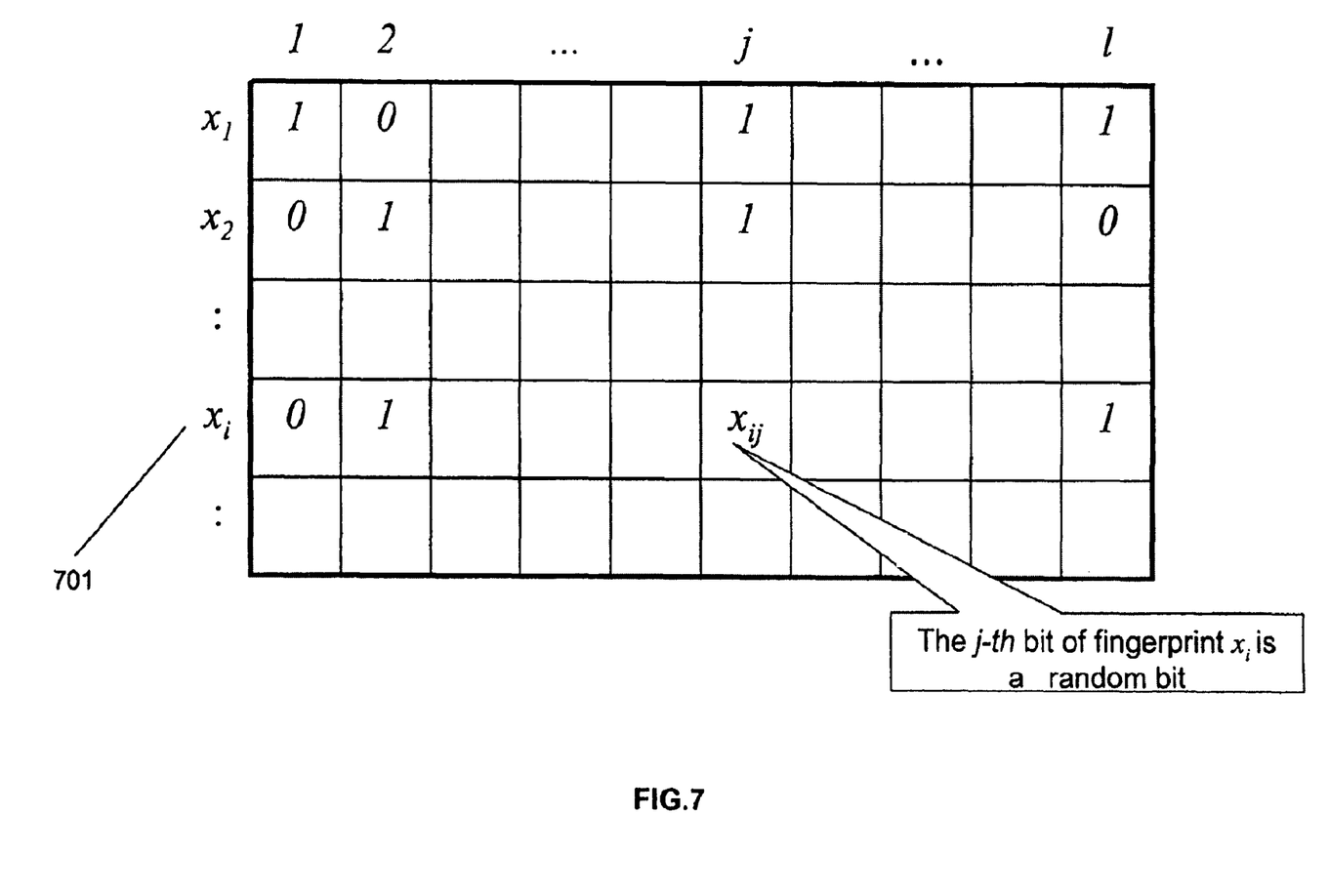
FIG. 7 illustrates one embodiment wherein digital fingerprints are represented as rows in a table of bits.

FIG. 7 illustrates one embodiment wherein digital fingerprints are represented by the rows of a table of random bits, where the table consists of n rows 701. Each column in the table corresponds to a position in each fingerprint. In this embodiment, the purchaser denoted by row number i is associated with the digital fingerprint $x_i$ 702. It can be seen in this embodiment that $x_{ij}$ denotes the j-th bit of fingerprint $x_i$ 703.

Figure 8:
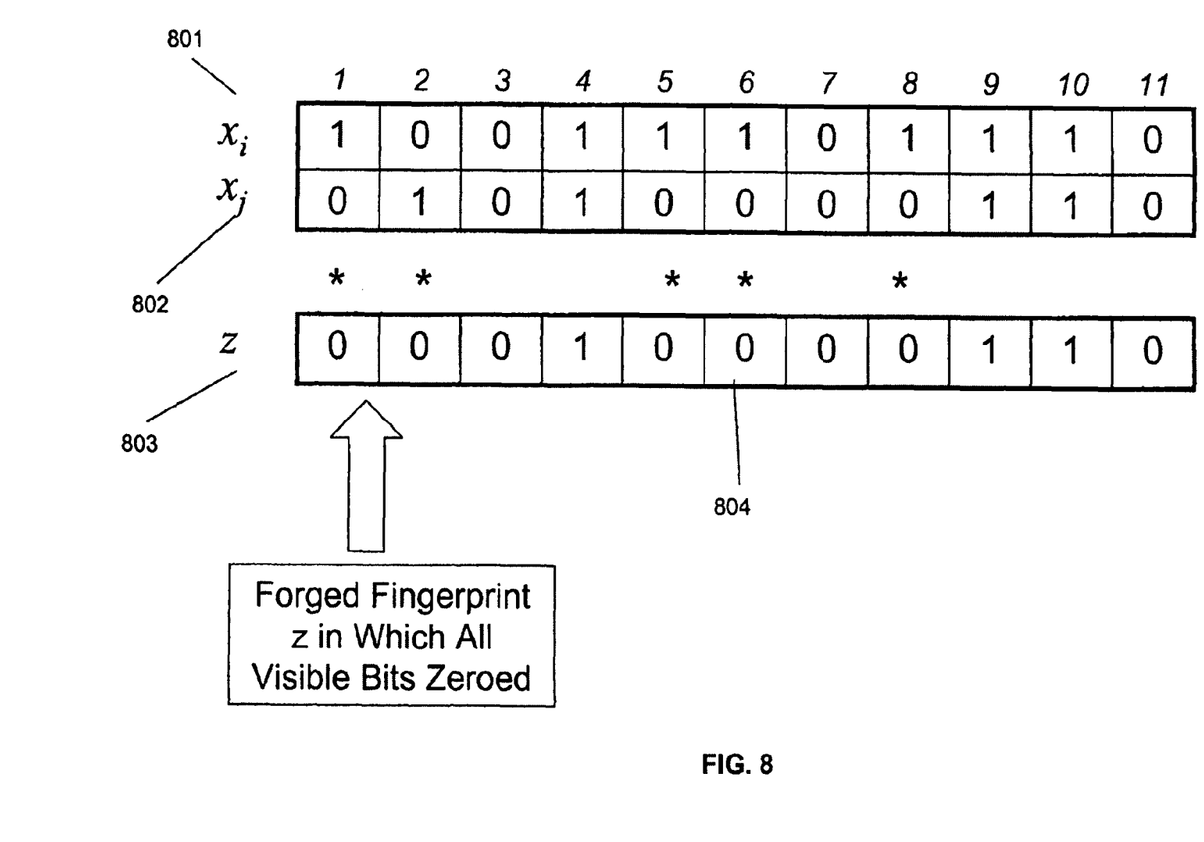
FIG. 8 illustrates how two purchasers may collude to produce a forged digital fingerprint.

A group of two purchasers colluding to forge a digital fingerprint in one embodiment of the present invention is illustrated in FIG. 8. In the embodiment of FIG. 8, rows of a table are used to represent digital fingerprints. Purchaser i, associated with row $x_i$ 801, and purchaser j, associated with row $x_j$ 802, compare their authorized copies and determine that their fingerprints differ at columns numbered 1, 2, 5, 6, and 8. Since their copies differ at these positions, these positions are visible to purchasers i and j. In this embodiment, the colluders produce a forged fingerprint z by inserting a zero in each column 804 where their fingerprints differ. The resulting forged fingerprint z 803 is illustrated.

Figure 9:
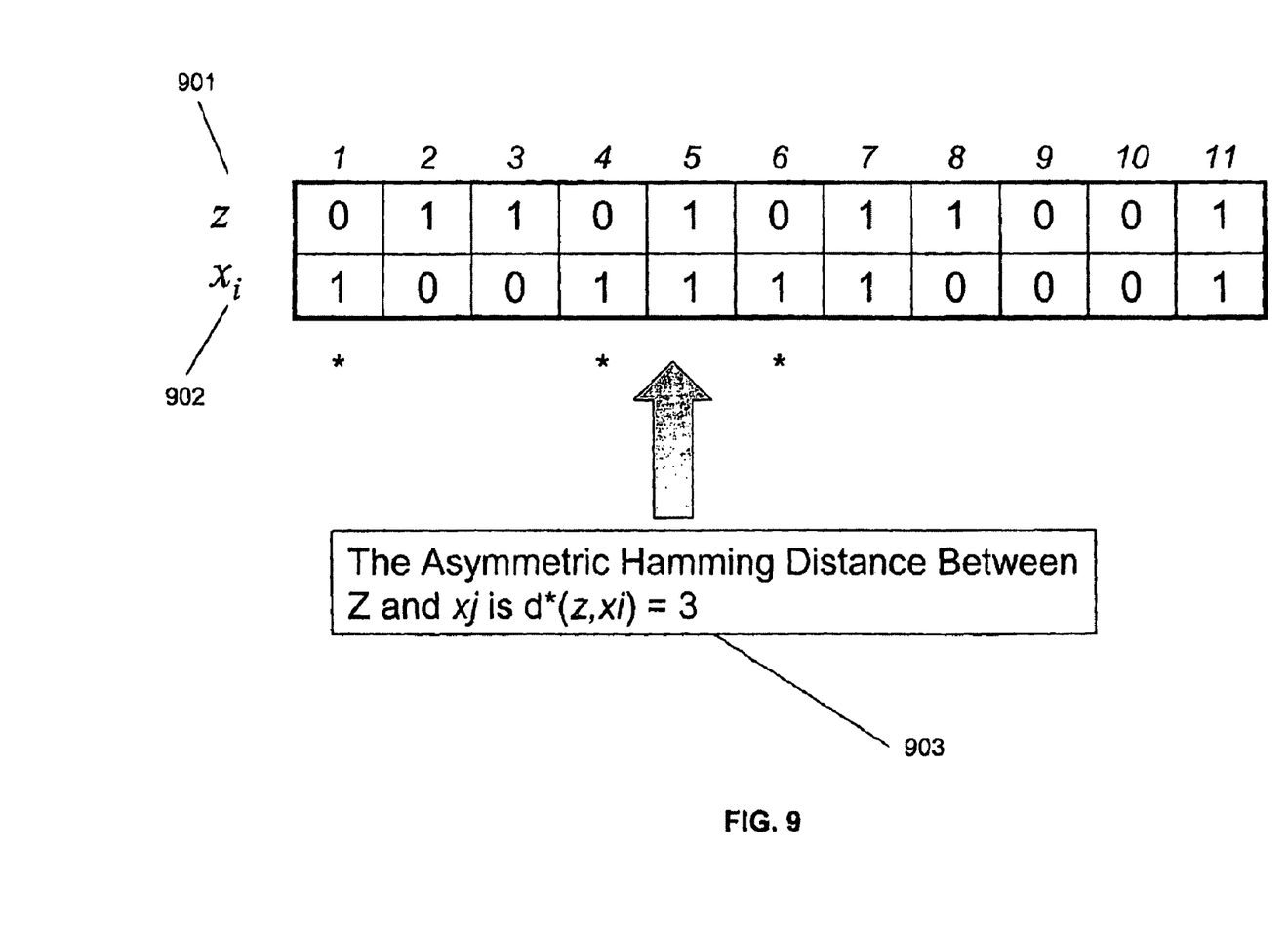
FIG. 9 illustrates how the asymmetric Hamming distance may be calculated in one embodiment so that a digital fingerprint forger may be identified.

FIG. 9 shows how the asymmetric Hamming distance is calculated in one embodiment so that a fingerprint forger can be determined from among a group of forgers. FIG. 9 shows a forged fingerprint z 901 and an authorized fingerprint $x_i$ 902, each represented by rows of a table of bits. Fingerprint $x_i$ is associated with purchaser i. The asymmetric Hamming distance d between z and $x_i$ is the sum of the number of columns where bit $x_i$ is 1 and bit $z_i$ is 0. Thus, it can be seen that the asymmetric Hamming distance between $x_i$ and z in FIG. 9 is 3 903 in this embodiment.

Figure 10:
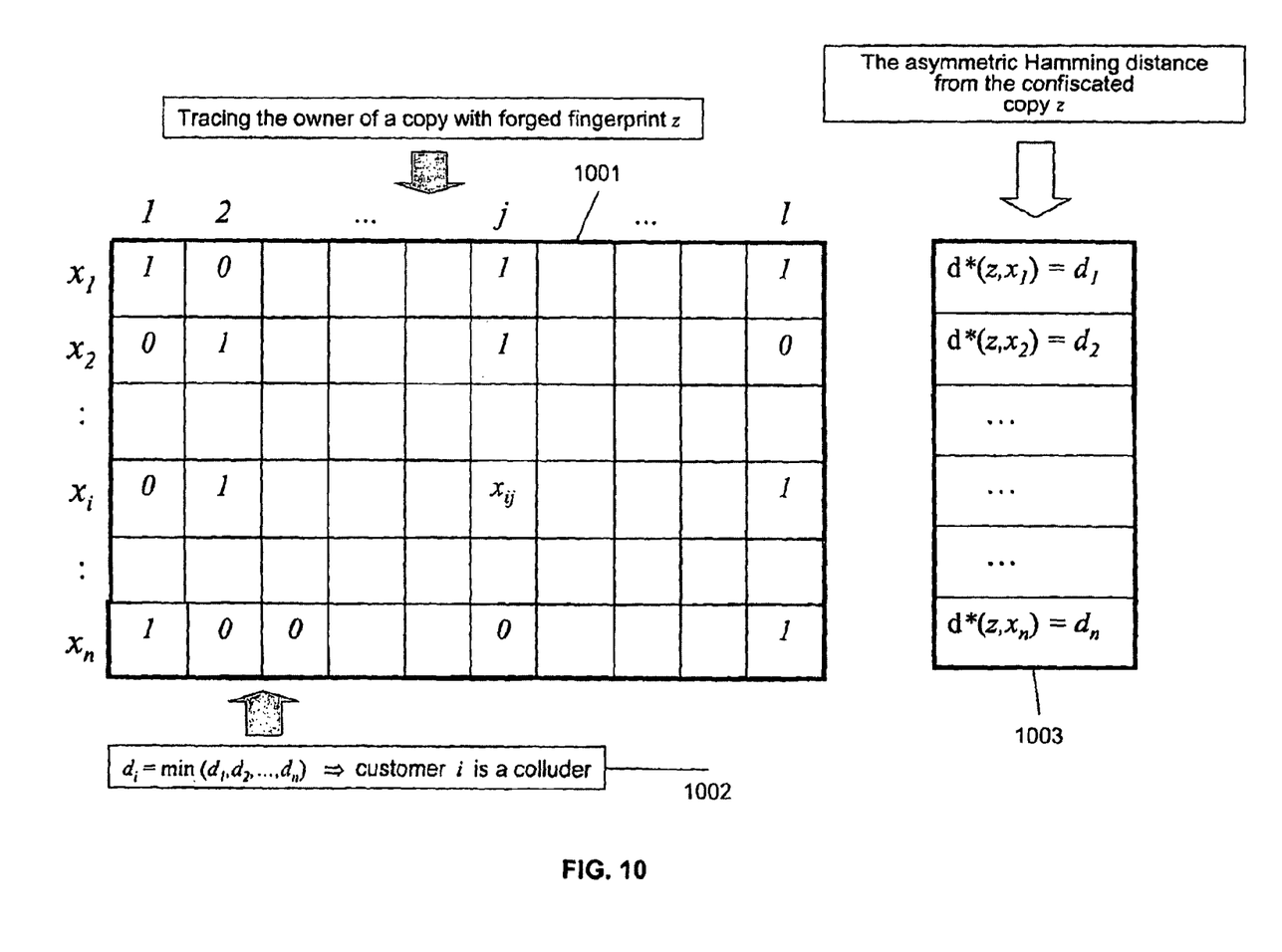
FIG. 10 illustrates how one from a group of forgers is determined in one embodiment based on a forged fingerprint z.

FIG. 10 illustrates how one from a group of forgers is determined in one embodiment based on a forged fingerprint z. In this embodiment, digital fingerprints are represented by rows in a table of bits 1001, where row $x_i$ represents the fingerprint of purchaser i, with n total fingerprints. The Hamming distance 903 d is then calculated for each fingerprint $x_i$-z pair 1003, with the resulting values being stored in a list. The purchaser $x_i$ with the minimum Hamming value $d_i$ is then chosen 1002 from the list of Hamming values. The present invention has thus identified that the forger is purchaser i.

What is claimed:

1. A method for using random bits as a digital fingerprint in an electronic document, comprising the steps of:
   a. generating, by a computer, a set of random bits, wherein generating the set of random bits further comprises the steps of:
      i. identifying a number of persons colluding to forge a digital fingerprint (c);
      ii. using the number of persons colluding c to choose a real number p such that $1-(1/c)<p<1$, wherein p represents a probability; and
      iii. generating each bit in the set randomly such that bit 1 has the probability p and bit 0 has a probability 1−p;
   b. selecting, by the computer, a sub-set of bits from the set of random bits; and
   c. using, by the computer, the selected sub-set of bits as a digital fingerprint for an electronic document.

2. The method as recited in claim 1, wherein using the selected sub-set of random bits as a digital fingerprint for an electronic document further comprises the steps of:
   a. inserting the fingerprint into an electronic document;
   b. associating the inserted fingerprint with a purchaser of the electronic document;

c. storing the fingerprint and purchaser information in a database.

3. The method as recited in claim 2, where an unauthorized copy of an electronic document can be traced back to a purchaser involved in producing the unauthorized document, the method comprising:
   a. extracting a fingerprint from an unauthorized copy of the electronic document;
   b. determining the asymmetric Hamming distance between the extracted fingerprint and at least one authorized fingerprint;
   c. choosing the authorized fingerprint with the minimum Hamming distance to the extracted fingerprint;
   d. tracing the purchaser involved in producing the unauthorized copy by retrieving the purchaser information associated with the chosen authorized fingerprint.

4. A method for using pseudo-random bits as a digital fingerprint in an electronic document, comprising the steps of:
   a. generating, by a computer, a set of pseudo-random bits, wherein generating the set of pseudo-random bits further comprises the steps of:
      i. generating a random key;
      ii. using the random key as input to a pseudo-random number generator;
      iii. identifying a number of persons colluding to forge a digital fingerprint (c);
      iv. using the number of persons colluding c to choose a real number p such that $1-(1/c) \leq p \leq 1$, wherein p represents a probability; and
      v. generating a set of pseudo-random bits by assigning the output of the pseudo-random number generator to the set of pseudo-random bits in such a way that bit 1 is assigned the probability p and bit 0 a probability $1-p$;
   b. selecting, by the computer, a sub-set of bits from the set of pseudo-random bits; and
   c. using, by the computer, the selected sub-set of bits as a digital fingerprint for an electronic document.

5. The method as recited in claim 4, wherein using the selected sub-set of pseudo-random bits as a digital fingerprint for an electronic document further comprises the steps of:
   a. inserting the fingerprint into an electronic document;
   b. associating the inserted fingerprint with a purchaser of the electronic document;
   c. storing the fingerprint and purchaser information in a database.

6. The method as recited in claim 5, where an unauthorized copy of an electronic document can be traced back to a purchaser involved in producing the unauthorized document, the method comprising:
   a. extracting a fingerprint from an unauthorized copy of the electronic document;
   b. determining the asymmetric Hamming distance between the extracted fingerprint and at least one authorized fingerprint;
   c. choosing the authorized fingerprint with the minimum Hamming distance to the extracted fingerprint;
   d. tracing the purchaser involved in producing the unauthorized copy by retrieving the purchaser information associated with the chosen authorized fingerprint.

* * * * *